United States Patent
Aoki et al.

(10) Patent No.: US 9,338,438 B2
(45) Date of Patent: May 10, 2016

(54) CALIBRATING RANGE-FINDING SYSTEM USING PARALLAX FROM TWO DIFFERENT VIEWPOINTS AND VEHICLE MOUNTING THE RANGE-FINDING SYSTEM

(71) Applicants: Shin Aoki, Kanagawa (JP); Fumiko Sakoh, Kanagawa (JP)

(72) Inventors: Shin Aoki, Kanagawa (JP); Fumiko Sakoh, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 188 days.

(21) Appl. No.: 13/798,321

(22) Filed: Mar. 13, 2013

(65) Prior Publication Data

US 2013/0250065 A1 Sep. 26, 2013

(30) Foreign Application Priority Data

Mar. 21, 2012 (JP) ................................ 2012-063705
Jan. 11, 2013 (JP) ................................ 2013-003413

(51) Int. Cl.
*H04N 13/02* (2006.01)
*G06T 7/00* (2006.01)

(52) U.S. Cl.
CPC ............ *H04N 13/0246* (2013.01); *G06T 7/002* (2013.01); *G06T 2207/10021* (2013.01); *G06T 2207/30261* (2013.01)

(58) Field of Classification Search
CPC ................. H04N 13/0246; G06T 2207/30261; G06T 2207/10021; G06T 7/002
See application file for complete search history.

(56) References Cited

U.S. PATENT DOCUMENTS

| | | | | |
|---|---|---|---|---|
| 5,915,033 | A * | 6/1999 | Tanigawa et al. | 382/106 |
| 6,269,175 | B1 * | 7/2001 | Hanna et al. | 382/107 |
| 2009/0046924 | A1 * | 2/2009 | Morimitsu | 382/154 |
| 2010/0128140 | A1 | 5/2010 | Iijima et al. | |
| 2010/0283837 | A1 | 11/2010 | Oohchida et al. | |
| 2011/0292045 | A1 * | 12/2011 | Nakamura et al. | 345/419 |
| 2012/0044340 | A1 * | 2/2012 | Yamamoto | 348/79 |
| 2012/0139902 | A1 * | 6/2012 | Fujisawa et al. | 345/419 |
| 2012/0188389 | A1 * | 7/2012 | Lin et al. | 348/218.1 |

(Continued)

FOREIGN PATENT DOCUMENTS

| | | |
|---|---|---|
| JP | 10-307352 | 11/1998 |
| JP | 2001-091245 | 4/2001 |

(Continued)

OTHER PUBLICATIONS

Weng, J. et al., "Calibration of Stereo Cameras Using a Non-linear Distortion Model," Proceedings of the International Conference on Pattern Recognition, col. 1, Jun. 16, 1990, pp. 246-253.

(Continued)

*Primary Examiner* — Jay Patel
*Assistant Examiner* — Joseph Suh
(74) *Attorney, Agent, or Firm* — Harness, Dickey & Pierce, P.L.C.

(57) ABSTRACT

A range-finding system includes two imaging devices to capture multiple images from two different viewpoints and a parallax calculator to calculate parallax based on the multiple images captured by the two imaging devices. The parallax calculator includes an estimation unit to estimate a correction value based on the amount of image deviation in a lateral direction corresponding to pixel position in the images captured by the two imaging devices and a correction unit to correct a pre-correction parallax or an image based on the correction value estimated by the estimation unit.

6 Claims, 6 Drawing Sheets

(56) References Cited

U.S. PATENT DOCUMENTS

2012/0224027 A1* 9/2012 Takada .............................. 348/46
2012/0224069 A1   9/2012 Aoki
2013/0120543 A1* 5/2013 Chen et al. ...................... 348/51

FOREIGN PATENT DOCUMENTS

| JP | 2001-160137 | 6/2001 |
| JP | 2012-058188 | 3/2012 |
| WO | WO-2012/035983 A1 | 3/2012 |

OTHER PUBLICATIONS

Zhao, W. et al., "Effects of Camera Alignment Errors on Stereoscopic Depth Estimates," Pattern Recognition, vol. 29, No. 12, Dec. 1, 1996, pp. 2115-2126.
European Search Report dated Jul. 11, 2013.
Office Action for Corresponding European Patent Application No. 13159738.7 dated Mar. 26, 2015.

* cited by examiner

CALIBRATING RANGE-FINDING SYSTEM USING PARALLAX FROM TWO DIFFERENT VIEWPOINTS AND VEHICLE MOUNTING THE RANGE-FINDING SYSTEM

CROSS-REFERENCE TO RELATED APPLICATIONS

This patent application is based on and claims priority pursuant to 35 U.S.C. §119 to Japanese Patent Application Nos. 2012-063705, filed on Mar. 21, 2012 and 2013-003413, filed on Jan. 11, 2013 in the Japan Patent Office, the entire disclosures of which are hereby incorporated by reference herein.

BACKGROUND

1. Technical Field

The present invention relates to a range-finding system including a stereo camera system and a vehicle mounting the range-finding system.

2. Related Art

Collision avoidance systems involving the use of in-vehicle stereo camera systems have become more common. A stereoscopic image of the area in front of the vehicle is generated using the stereo camera systems, and an obstacle is detected and a distance to the obstacle is measured based on the generated stereoscopic image. The driver can then be alerted to take corrective action to avoid a collision or maintain a safe minimum distance between vehicles. Alternatively, the system can engage a control device such as the brakes and the steering.

FIG. 10 is a diagram for explaining a principle of range-finding in which two cameras are disposed in parallel. A camera 100a with a focal length f, an optical center $O_0$ and an imaging plane $S_0$ is disposed such that a direction of an optical axis extends in a upper direction in FIG. 10, and a camera 100b with the same focal length f is deposed in parallel with and spaced by a distance B with respect to the camera 100a on the right side.

An image of a subject A which is located at a distance d from an optical center $O_0$ of the camera 100a in the direction of the optical axis forms an image at a point $P_0$ which is the intersection of a straight line A-$O_0$ and an imaging plane $S_0$. With respect to the camera 100b, the subject A forms an image at a point $P_1$ on an imaging plane $S_1$. Here, an intersection of a line and the imaging plane $S_1$, which line passes through an optical center $O_1$ of the camera 100b and is parallel to the line A-$O_0$, is indicated by $P'_0$, and the distance between the point $P'_0$ and the point $P_1$ is indicated by p. The point $P'_0$ is the same as the point $P_0$ on the camera 100a. The distance p indicates a deviation amount $P'_0$-$P_1$ of the points on the images captured by these two cameras 100a and 100b and is called parallax. Then, a triangle $A_0$-$O_0$$O_1$ and a triangle $O_1$-$P'_0$-$P_1$ are geometrically similar and thus the following formula I is given.

$$d = \frac{Bf}{p} \quad (1)$$

where B represents the base line length of the triangle. If the base line length B and the focal length f are known, the distance d can be determined based on the parallax p.

In order for the above-described principle of range-finding by stereo camera system to hold, the two cameras 100a and 100b must be disposed precisely, as shown in FIG. 10. However, when the two cameras are mounted in a vehicle, it is difficult to dispose the cameras in parallel without some error, and therefore parallax correction techniques using signal processing are proposed.

As one example, after the stereo camera system is assembled, by capturing a test chart set at a known position, relative positions of the two cameras are accurately measured. Then, using the measured data and deforming the captured image, a pseudo-parallel arrangement can be realized. At this time, the image data is modified by affine conversion.

In another example, in order to correct non-linear deviation, such as aberration of distortion of the optical lenses, which cannot be modified only by affine conversion, a table is used the contents of which are determined based on data of a captured test chart set at a known position.

In yet another example, a technique to correct the deviation caused by distortion and temperature change in actual use is proposed. During actual use, it is difficult to capture the known test chart, unlike during the manufacturing process. Instead, using only how parallel the dividing line on the road is, the deviation amount is calculated.

Herein, to maintain consistently accurate range-finding in the above-described range-finding device, precise calibration is needed. Accordingly, various calibration techniques are proposed.

Known calibration techniques fall roughly into two categories: Those having set times for executing calibration and those having a degree of flexibility in modifying the image.

More specifically, the timing for executing calibration can be divided into two types: Those done during manufacturing and those done while in use. For example, in the calibration in manufacturing, the optical distortion of the lens and deviations arising in assembling are measured and corrected in manufacturing. By contrast, in the calibration in use, the influenced by temperature change and vibration over time is measured and corrected. The flexibility of the image deformation means, for example, affine conversion, non-linear conversion, and parallel movement having a predetermine offset.

However, in the calibration in use, a known object such as a test chart cannot be captured, and image conversion other than with a particular offset cannot be executed. Therefore, it is difficult to measure image deviation in the lateral direction accurately. However, when two cameras are set at ideal position, such as without aberration in assembling, corresponding points between a left image captured by a left camera and a right image captured by a right camera always show parallax in the lateral direction. Therefore, if a vertical component of the position difference between the corresponding points is present, it can be easily assumed that there is image deviation in the vertical direction based on the position difference between the corresponding points. By contrast, with the parallax in the lateral direction, a true value thereof depends on the distance to the object, and therefore detecting or estimating the amount of the deviation in the lateral direction is difficult.

In yet another example, using how parallel is the dividing line and the number of motionless objects, the parallax offset, that is, a parallel moving amount of the entire image in the left image and the right image in the lateral direction is estimated. However, image deviation in the lateral direction of the stereo camera system having two cameras provided in parallel is not limited to the parallel movement. Accordingly, the image deviation in the lateral direction cannot be measured and corrected without using the known test chart in use.

The types of lateral deviation possible in a stereo camera system are described below. The lateral deviation generated in the stereo camera system includes lateral deviation caused by rotation around a vertical axis and horizontal deviation caused by change in distortion characteristics. When a line of vision of the camera is slightly changed in a given direction, the lateral deviation caused by rotation around a vertical axis is moved to an opposite direction to the predetermined captured image. However, at this time, the image is not moved strictly in parallel.

For example, as illustrated in FIG. 11A, when a camera 100 is tilted to the left, a rectangle positioned in front of the camera is deformed as shown in FIG. 11B. Although FIG. 11B exaggerates the effect, when the camera 100 is tilted to the left, a rectangle positioned in front of the camera is deformed from the rectangle 110 to a trapezoid 120. In this case, the entire image is deviated to the right, the size of the right side image is reduced, and the left side of the image approaches the center position. Therefore, compared to a position B adjacent to the center position of the image, a left side point A is greatly moved to the right side. The right side of the image is expanded and the moved far from the center position, and a right end C is greatly moved to the right side.

As a result, the image deviation to right side is not uniform over the entire image, as illustrated in FIG. 12. In a comparative example, if the angle of deviation is very small, the trapezoid 120 shown in FIG. 11B is very near to the rectangle 110, which is regarded as pseudo-parallel movement. However, in order to detect the parallax more accurately, the parallax should be corrected not just regarding simple parallel movement but also as to deviation that varies depending on the pixel position.

Next, the lateral deviation caused by the change in the distortion characteristics is described. The focus lens system generally has aberration distortion characteristics. In an initial state, using the above-described table, non-linear deviation can be corrected but the distortion characteristics may change over time. In this case, the change in the center area of the image is small, but at the edges of the image the image deviation may be something other than parallel movement, such as expansion or contraction.

Furthermore, if deviation other than that which is symmetrical around the optical axis occurs, such as, tilt or eccentricity of the lenses, anisotropic distortion is generated, resulting in even more complicated deviation.

SUMMARY

In one aspect of this disclosure, there is a range-finding system that includes two imaging devices and a parallax calculator. The two imaging devices capture multiple images from two different viewpoints. The parallax calculator calculates parallax based on the multiple images captured by the two imaging devices. The parallax calculator includes an estimation unit and a correction unit. The estimation unit estimates a correction value based on the amount of image deviation in a lateral direction corresponding to pixel position in the images captured by the two imaging devices. The correction unit corrects a pre-correction parallax or an image based on the correction value estimated by the estimation unit.

In another aspect of this disclosure, there is provided a novel a vehicle including the above-described range-finding system.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
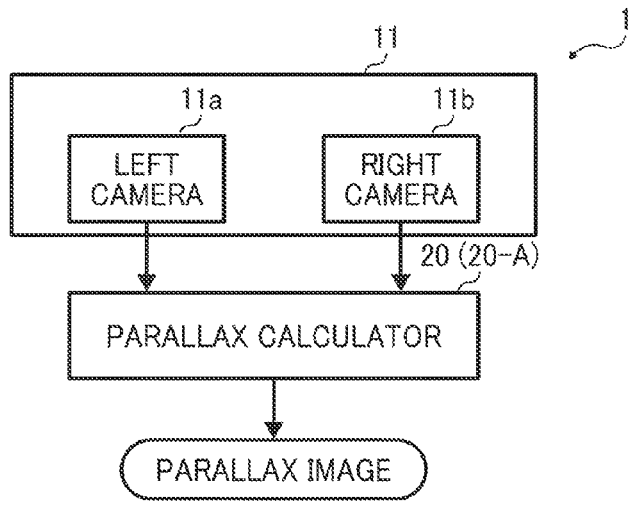
FIG. 1 is a hardware block diagram illustrating a range-finding system including a stereo camera system according to the present disclosure.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Referring now to the drawings, wherein like reference numerals designate identical or corresponding parts throughout the several views thereof, and particularly to FIGS. 1 through 9, a range-finding system according to illustrative embodiments of the present disclosure is described.

Next, a range-finding system 1 is described below with reference to FIG. 1 according to the present disclosure. FIG. 1 is a block diagram illustrating a hardware configuration of the range-finding system 1. In FIG. 1, the range-finding system 1 includes a stereo camera system 11 in which a left camera 11a and a right camera 11b (two imaging devices) are arranged in parallel, and a parallax calculator 20. The left camera 11a and the right camera 11b capture images from two different points. The captured images acquired by the left camera 11a and the right camera 11b are input to the parallax calculator 20, and the parallax calculator 20 outputs parallax image data. The parallax calculator 20 is a general electronic computer constituted by a central processing unit (CPU), a dynamic random access memory (DRAM), and a non-volatile flash memory. The range-finding function (parallax calculation function) is memorized in the flash memory, which is implemented as a software program to be executed by the CPU and the DRAM. In the present embodiment, although the stereo camera system 11 includes two cameras 11a and 11b; this is just example; alternatively, the stereo camera system can include at least three cameras.

First Embodiment

Figure 2:
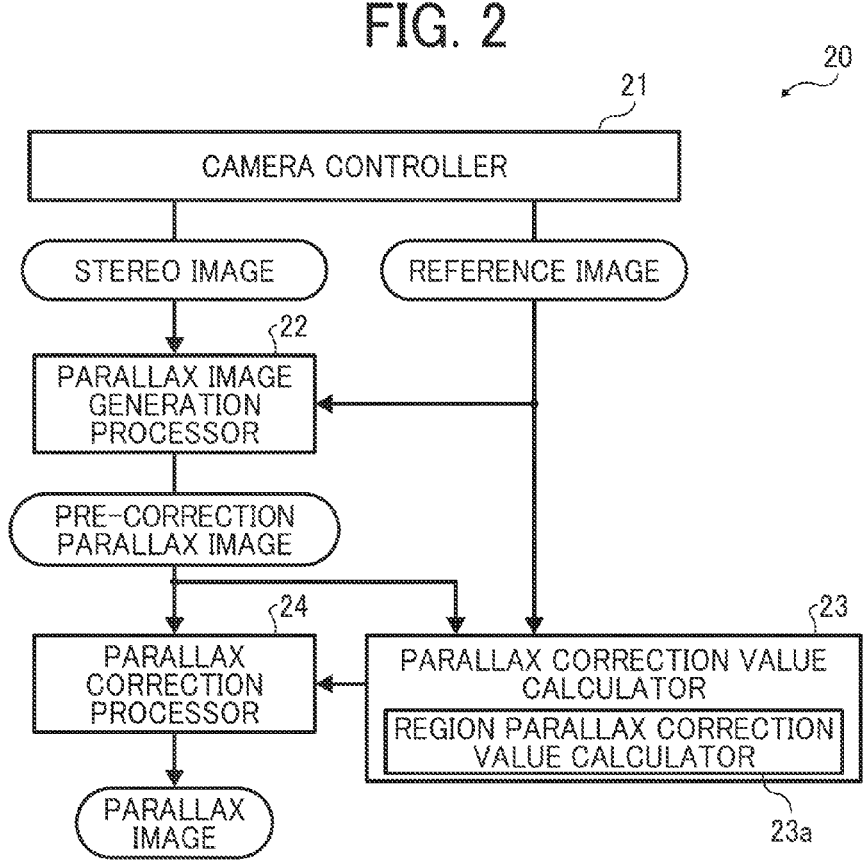
FIG. 2 is a software block diagram illustrating a configuration of a parallax calculator in the range-finding system according to a first embodiment of the present disclosure.

FIG. 2 is a block diagram illustrating a software module executed by the parallax calculator 20 according to a first embodiment. The parallax calculator 20 includes a camera controller 21, a parallax image generation processor 22, a parallax correction value calculator 23, and a parallax correction processor 24. The camera controller 21 controls the two cameras 11a and 11b and receives the image data based on the captured images. In addition, the camera controller 21 executes two-cameras synchronizing, camera initializing, and exposure controlling for outputting a stereo image and an image.

Furthermore, it is desirable that, immediately after the image data is input, the camera controller 21 corrects the image (other than correcting the parallax offset) using processes that are generally considered effective for stereoscopic range-finding, such as correction of optical distortion, correction of image rotation, etc., if needed. The parallax image generation processor 22 generates pre-correction parallax images from the stereo image (reference image and comparison image) input from the camera controller 21, which plays a major role as the range-finding function. The parallax image generation processor 22, serving as the corresponding position difference calculator, receives the stereo image (reference image and the comparison image) for calculating parallax per pixels to generate a pre-correction parallax image. The operation in the parallax image generation processor 22 is described in further detail later.

The parallax correction value calculation processor 23, serving as an estimation unit, has a function of a region parallax correction value calculation processor 23a to calculate the correction value of parallax by the regions. Then, using the reference image input from the camera controller 21 and the pre-correction parallax image input from the parallax image generation processor 22, the parallax correction value calculation processor 23 calculates the correction value of the parallax for each of X-coordinate. That is, assuming that the parallax correction value when the X-coordinate is a value "i" (X-coordinate=i), the parallax correction value calculation processor 23 generates table information [i. off(i)] for each pixel numbers of image width. The calculated parallax correction value is transmitted to the parallax correction processor 24 and is used for correcting the parallax image, which is further described later.

The parallax correction processor 24, serving as a correction unit, subtracts the correction value input from the parallax correction value calculation processor 23 from the pre-correction parallax value for each of pixels of the parallax image to correct the parallax image data. That is, assuming that a parallax value at a pixel position (i, j) is set at "d (i, j)" and the parallax correction value when the X-coordinate is the value "i" (X coordinate=i) is set at a value "off (i)", the parallax correction processor 24 outputs the value "O(i, j)=d (i, j)−off (i)" as the parallax value.

Figure 3:
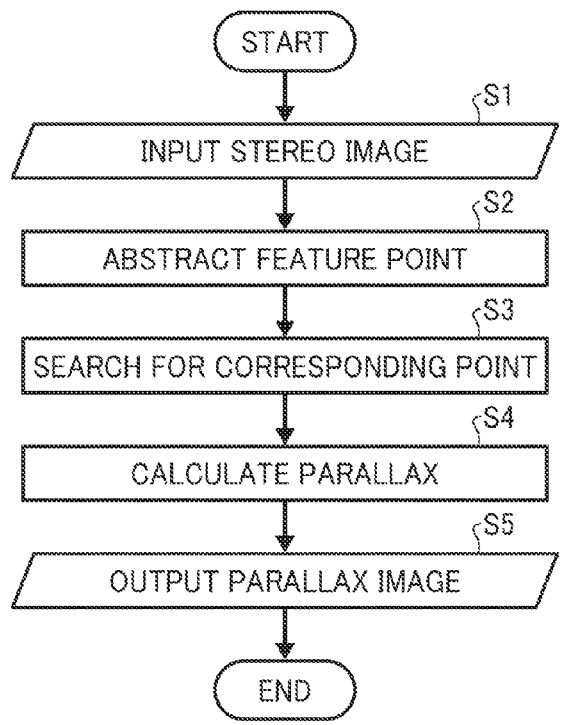
FIG. 3 is a flow chart illustrating a process executed by a parallax image generation processor shown in FIG. 2.

Next, with reference to FIG. 3, the process of the parallax image generation processor 22 is described. FIG. 3 is a flow chart illustrating a process executed by the parallax image generation processor 22 according to the first embodiment.

At step S1, the stereo image is input. At step S1, the parallax image generation processor 22 receives the stereo images (stereoscopic image) captured by the two cameras 11a and 11b arranged in parallel simultaneously.

At step S2, the parallax image generation processor 22 abstracts feature points whose shading is enormously changed from the reference images captured by the first camera 11a.

Then, at step S3, the parallax image generation processor 22 searches for the position of the corresponding points where the object detected as the feature point in the reference images is identical to the object shown in the comparison images, in a feature vicinity area (block) in the comparison images captured by the second camera 11b. For the search of the corresponding points, various types of known method, such as Sum of Absolute Difference (SAD) and phase only correlation (POC) can be applied.

At step S4, the parallax image generation processor 22 calculates the parallax (parallax data). More specifically, the parallax image generation processor 22 acquires the difference of the positions between the corresponding points in the comparison image and the feature point in the reference image to calculate the pre-correction parallax.

At step S5, the parallax image generation processor 22 outputs the calculated pre-correction parallax images. By repeating above-described process, the parallax images corresponding to the area in front of the cameras can be always kept outputting.

Figure 4:
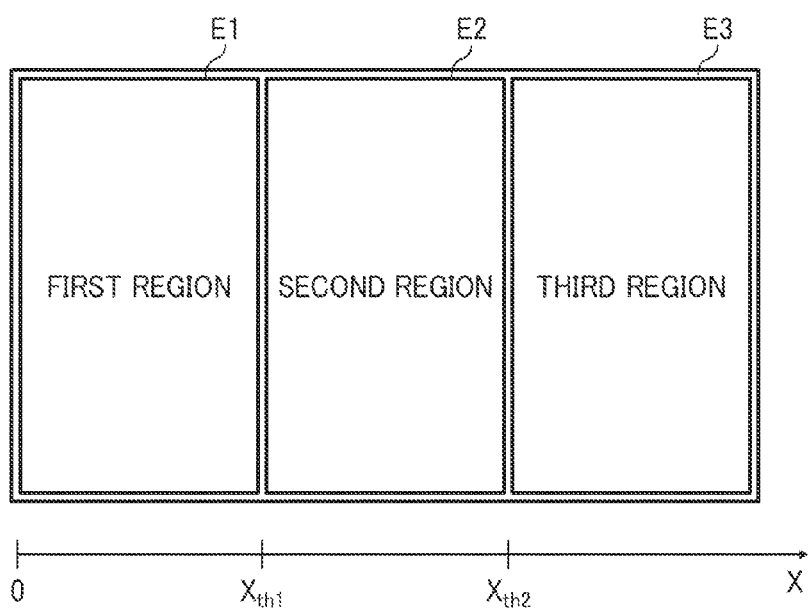
FIG. 4 is one example of an image divided into three image regions.

Next, the region parallax correction value calculation processor 23a is described below. The image is divided into three image regions having a first region E1, a second region E2, and a third region E3 as illustrated in FIG. 4. In parallax offset calculation process for each of the image region. That is, the region parallax correction value calculation processor 23 calculates the parallax offset based on collections (classes) of the parallax data pair of the feature point and the corresponding point where the same object is captured twice. Herein, the region parallax correction calculation processor 23a categorizes the three parts, depending on the region of which the feature points in the reference image is positioned in. More specifically, as illustrated in FIG. 4, assuming that the X-coordinate value of a border between the first region E1 and the second region E2 is $X_{th1}$, a X coordinate value of a border between the second region E2 and the third region E3 is $X_{th2}$, and the coordinate value of the feature is (X, Y), the region parallax correction calculation processor 22 categorizes the feature points as follows.

When the feature point X is smaller than a threshold value $X_{th1}$, the feature point X is categorized as class 1. When the feature point X is greater than a threshold value $X_{th2}$, the feature point X is categorized as class 3. When the feature point X is other case, the feature point X is categorized as class 2.

| FUTURE POINTS OF COORDINATE | CATEGORIZED CLASS |
|---|---|
| X < Xth1 | CLASS 1 |
| Xth1 ≤ X ≤ Xth2 | CLASS 2 |
| Xth2 < X | CLASS 3 |

Executing statistics processing for the respective classes independently, three items of parallax offset are estimated. Herein, if the number of feature points positioned in a certain image region is smaller than a threshold value determined in advance, the parallax offset in the certain region is not estimated, and the estimation result until a previous frame is directly adapted.

Next, the parallax correction value process for each of the X-coordinate is described below. Herein, central positions of the first region E1, the second region E2, and the third region E3 in the X-coordinate are represented as $X_1$, $X_2$, and $X_3$. The results of the parallax offset calculation processing by the first through three regions E1, E2, and E3 are regarded as the correction values at the three locations $X_1$, $X_2$, and $X_3$. Then, using linear interpolation, the correction values in entire X-coordinate are calculated. More specifically, the correction value in the range of lower than the value $X_2$ ($X<X_2$) is acquired by the linear interpolation of the parallax offset between the coordinate points $X_1$ and $X_2$. The correction value in the range of greater than the value (coordinate point) $X_2$ ($X_2$, $>X$) is acquired by the linear interpolation of the parallax offset between of the values $X_2$ and $X_3$. The table containing the values (X-coordinate, the correction value) for each 1 pixel in the image width is output to the parallax correction processor 24.

Figure 5:
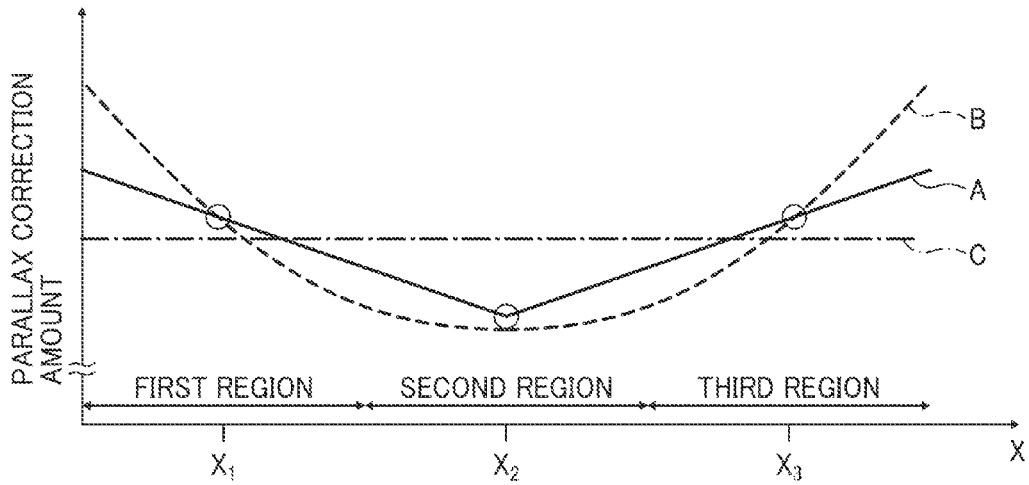
FIG. 5 is a graph illustrating calculation examples of parallax correction values according to the first embodiment.

FIG. 5 is a graph illustrating calculation examples of the parallax correction values. In FIG. 5, a lateral axis represents the X-coordinate, and a vertical axis represents the parallax correction value. In FIG. 5, white circles represent the parallax offset (=parallax correction value) for each of the three regions, and a solid line A represents the correction value at the entire X coordinate acquired by the linear interpolation. FIG. 5, a broken line B represents an ideal correction value shown in FIG. 12 and an alternate long and short dash line C represents a correction value when a constant correction value (parallax) is used. As is clear from FIG. 5, the correction value (solid line A) of the present embodiment is more likely to be near the ideal value (broken line B), compared to the correction value when the constant correction value is used (alternate long and short dash line C).

In the first embodiment, the captured image is divided into three regions shown in FIG. 4 as the image regions, this is just one example. Various types of dividing method can be set depending on the characteristics of the change of the stereo camera system 11 over time. For example, the number of divided regions and the divided direction can be changed. In addition, gaps or overlaps among the regions can be provided. In the first embodiment, although the region parallax correction value calculation processor 23a that calculates the parallax correction value by the multiple regions is described as one example of the parallax correction value calculation processor 23, other configuration can be applied for the parallax correction value calculation processor 23.

In addition, although the correction value table for 1 pixel in X-coordinate is used as the correction value corresponding to the pixel position in the first embodiment, other types of data can express "X coordinate—correction value space", using a polynomial expression, polygonal line, and a spline curve, etc. Further, in the first embodiment, although the parallax correction value calculation process is performed for 2 frames, the processing time can be changed by deleting the information in the frame whose reliability is low after evaluation of the reliability or accumulating the data in the frames, which can improve accuracy and stability in the calculation process.

As described above, in the range-finding system of the first embodiment, using two cameras 11a and 11b, a great number of pairs of parallax data between the two images captured from the two different points are collected. Furthermore, in the region parallax correction value calculation processor 23a, the parallax offset is calculated by executing statistics processing for the classes of the parallax data pairs. Since the feature points originally cover specific positions in the image, in the first embodiment, the pairs of parallax data are classified into the regions depending on the positions of the feature points, which detects the parallax offset for each image region.

Referring back to FIG. 4, the entire image is divided into three regions having the first region E1, the second region E2, and the third region E3. Then, the pairs of parallax data are classified into three classes, depending on where the feature points are positioned among the image regions. As for the respective collection, by executing the statistics process, the region parallax correction value calculation processor 23a can estimate the parallax offset value in the respective image regions.

Figure 11A:
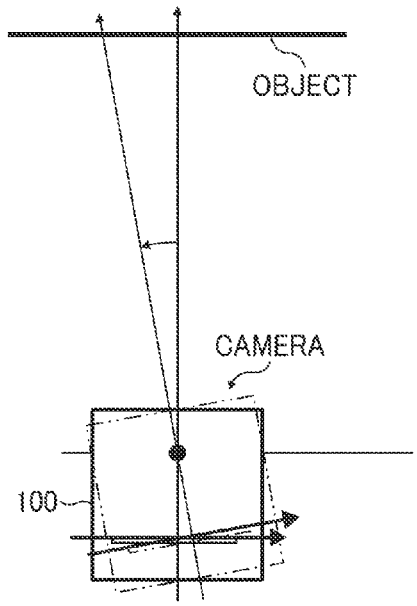
FIGS. 11A and 11B are image deviation examples caused by rotation of the camera.
Figure 11B:
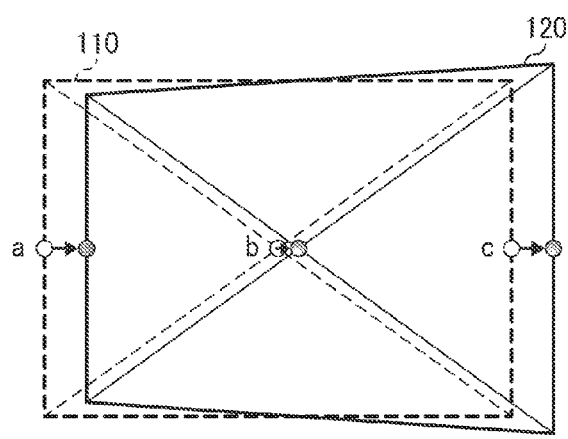
Figure 12:
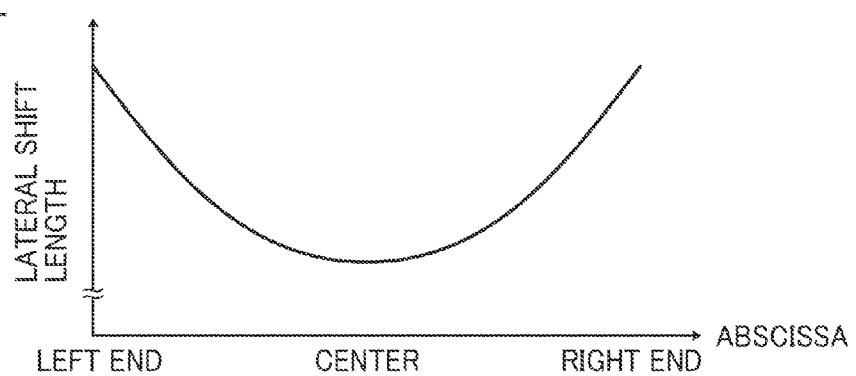
FIG. 12 is a graph illustrating a lateral deviation of the image caused by the rotation of the cameras.

Accurately, what is estimated in the way is not direct the deviation amount of the captured image like that shown in FIGS. 11 and 12, but the change amount in the parallax between the two captured images. The parallax is changed depending on the distance to the object, and the change amount in the parallax is equal to the division amount of the position between the two images.

However, when the change in the deviation amount is moderately changed relative to the pixel position as illustrated in FIG. 12, or when the target parallax is small relative to the rate of change (for example, when the parallax is lower than one-twentieth of the image width), the parallax offset can be treated as the deviation amount of the difference between the two images. Furthermore, as the parallax is smaller, the minimal image deviation is seriously influenced. For example, the deviation of 0.5 pixels corresponds to only 0.5% error for 100 pixels parallax but corresponds to the 50% deviation to 1 pixel parallax.

In order to solve this problem, in the first embodiment, the parallax offset value depending on the pixel position is treated as the image deviation of the difference between the two images. Then, using the deviation of the difference, the parallax correction processor 24, serving as the correction unit, corrects the pre-correction parallax data to output the parallax image. Accordingly, not uniform the image deviation in a lateral direction can be corrected without using the known objects, such as test chart in use, which can generate parallax image with higher degree of accuracy.

In the first embodiment, the parallax generation processor (corresponding point difference calculator) 22 searches for the corresponding point among the multiple images and calculates the pre-correction parallax data as the difference in the coordinate between the feature points and the corresponding points. Then, the parallax correction processor 24, serving as the correction unit, corrects the parallax data based on the correction value from the parallax correction processor (estimation unit) 23, which can achieve the correction of the pixel deviation in the lateral direction depending on the pixel position, with a simple calculation.

Herein, as a comparative example in which the parallax is calculated based on the dividing line and the stop line on the road, the system can measure only an average parallax offset value in the entire image region where the dividing line is appeared. Then, the position at which the image captured by the vehicle front facing camera showing the white line on the road does not change in the lower area in the image, the offset measure by the region cannot be performed. By contrast, in the present embodiment, by using the parallax offset measuring method using the statistics process on basis of the feature points, the offset measurement by the regions can be achieved.

Second Embodiment

Next, a parallax calculation method according to a second embodiment is described below, with reference to FIGS. 6 through 8. Although the parallax data is corrected in the first embodiment, the comparison image used for generating the parallax image is corrected in the second embodiment. In the second embodiment, if image correction processes to correct optical distortion and assembly error are present, these correction processes are incorporated in the image correction process for the comparison image, thereby eliminating the need for a subsequent process to correct the parallax image. It is to be noted that, the entire configuration and the hardware configuration in the second embodiment is similar to the first embodiment thereof, therefore, the description thereof is omitted. Next, what is different from the first embodiment in the contents of the software process is described below.

Figure 6:
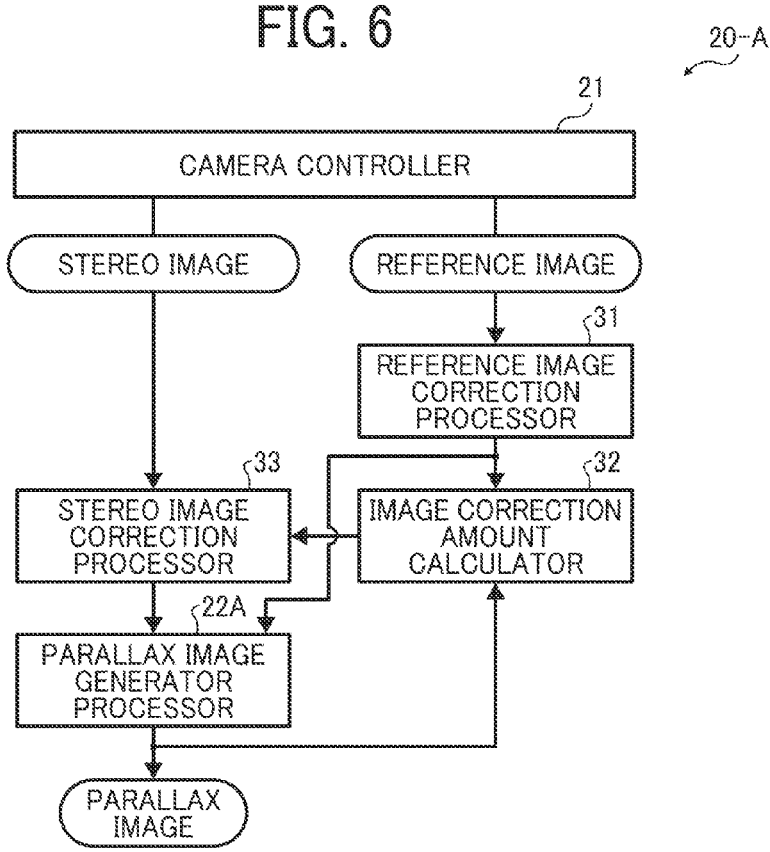
FIG. 6 is a software block diagram illustrating a configuration of a parallax calculator in the range-finding system according to a second embodiment of the present disclosure.

FIG. 6 is a block diagram illustrating the entire configuration of the software module executed by a parallax calculator 20-A. In FIG. 6, components of the parallax calculator 20-A identical to those of the parallax calculator 20 are represented by identical numerals and the description thereof is omitted below. In the second embodiment shown in FIG. 6, the parallax calculator 20-A includes the camera controller 21, a reference image correction processor 31, an image correction value calculation processor 32, a comparison image correction processor 33, and the parallax image generation processor 22A. Similarly to the first embodiment, the camera controller 21 controls the two cameras, and outputs the reference image and the comparison image.

Figure 7:
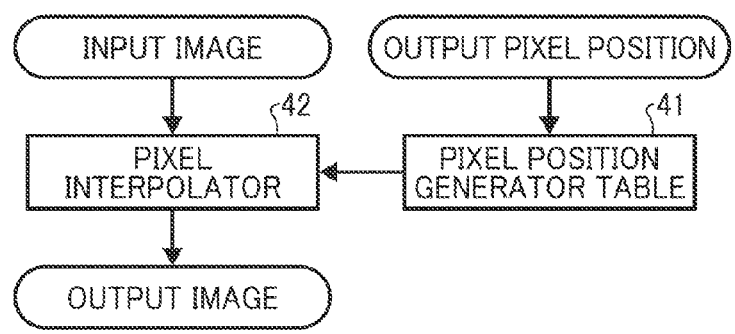
FIG. 7 is a flow chart illustrating a modification process for a reference image.

The reference image correction processor 31, serving as a first image correction unit, compensates deformation of the reference image (modifies the reference image) depending on measured deviation in and distortion characteristics in manufacture of the stereo camera system 11. FIG. 7 is a block diagram illustrating interior configuration of the reference image correction processor 31; in other words, FIG. 7 is a flow chart illustrating a modification processing in the reference image executed by the reference image correction processor 31. As a general image modification processing, a pixel position generation table (coordinate generation processor) 41 that calculates the pixel position in the correlating the input image, for the entire pixel positions of the output, and an image interpolate unit 42 that calculates the pixel values on the input image correlating to the calculated pixel position, are provided. Herein, the pixel value is not limited to integer.

In the second embodiment, an X-Y coordinate for the entire pixels are memorized as a table in advance, then, referring the memorized table, the pixel on the input image is generated. The table 41 is generated by capturing a test chart installed in known positions during manufacturing and interpolating the pixels between the feature points, and the table 41 is memorized in the stereo camera system 11. Although the table is used as the coordinate generation processor in the second embodiment, the position pixel can be generated other than using table, such as coordinate conversion by polynomial calculation.

Similarly to the parallax correction value calculation processor 23, the image correction value calculation processor 32, serving as the estimation unit, divides the image into the multiple image regions (see FIG. 4) and acquires the parallax offset by the respective image regions, and interpolates the parallax offset for output as the correction value (image correction value). Herein, in the second embodiment, the correction value output from the image correction value calculation processor 32 is used for correcting the comparison images.

Similarly to the reference image correction processor 31, the comparison image correction processor 33, serving as a second image correction unit, compensates the deformation of the comparison image (modifies the comparison image). However, although the reference image is corrected based on the deviation characteristics measured in manufacturing the stereo camera system 11, the comparison image is corrected based on the deviation calculated by the image correction value processor 32 in use, in addition to the characteristics measured and memorized in advance.

Figure 8:
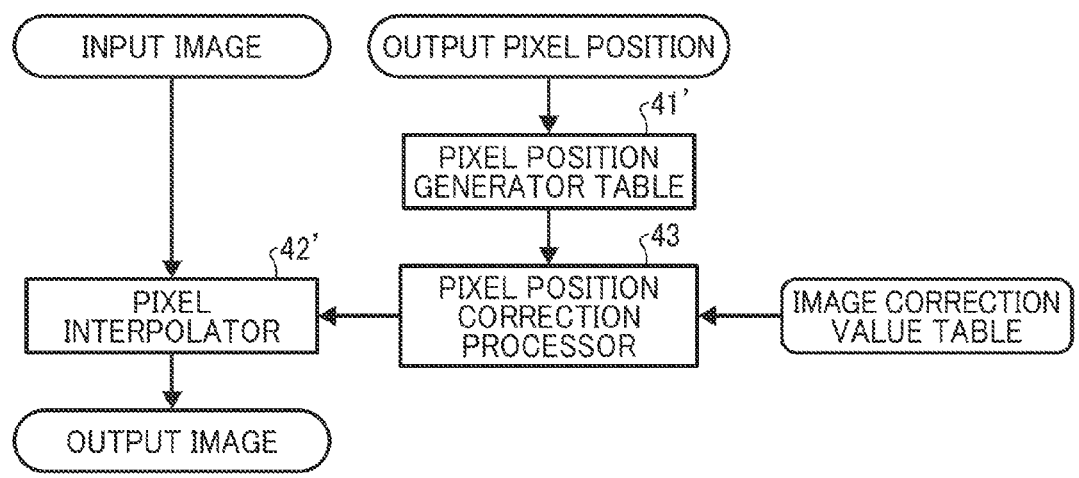
FIG. 8 is a flow chart illustrating a modification process for a comparison image.

FIG. 8 is a block diagram illustrating an interior configuration of the comparison image correction processor 33; in other words, FIG. 8 is a flow chart illustrating a modification processing in the comparison image executed by the comparison image correction processor 33. The comparison image correction processor 33 includes the pixel position generation table 41', the pixel interpolator 42', and a pixel position correction processor 43. It is to be noted that, in FIG. 8, components of the comparison image correction processor 33 identical to those of the reference image correction processor 31 are represented by identical numerals and the description thereof is omitted below. The pixel position generation table 41' memorizes the characteristic measured in manufacturing the stereo camera system 11, similar above.

The pixel position correction processor 43 uses the image correction value for each of X-coordinate input from the image correction value calculation processor 32 to correct the pixel position data memorized in the table 41'. More specifically, the pixel position correction processor 43 adds the correction value "off(i)" corresponding to the X-coordinate in the X-Y coordinate space (X, Y) read from the table 41-A. Therefore, when the parallax is too large; that is, the parallax is positioned on a right side, compared to the reference image, the comparison image is modified so that the comparison image is moved to left side, and the parallax calculated in the subsequent process can be set smaller. Herein, when the X-coordinate is not integer, for example, the X-coordinate may round off to get the integer numeral.

The parallax image generation processor 22A, serving as the corresponding position difference calculator, receives the corrected reference image and the corrected comparison image and generates the parallax image, similarly to process in the first embodiment. The input comparison image is already slid by the parallax offset calculated in the image correction value calculation process, and the noise for the parallax offset is minimized.

Herein, although the results of the image correction value processor 32 is reflected only for the correction of the comparison image in the second embodiment, the results thereof can be reflected to the correction of the reference image side, or the results (correction value) can be distributed into the reference image and the comparison image. That is, not only the comparison image correction processor 33, the reference image correction processor 31, or both the comparison image correction processor 33 and the reference image correction processor 31 can function as the correction unit.

As described above, in the second embodiment, the parallax offset value depending on the pixel position is treated as the deviation between the corrected comparison image and the corrected reference image, and the comparison image can be corrected using the parallax offset value. Accordingly, not-uniform image deviation in the lateral direction can be corrected, without using the known object, such as test chart, in use.

Further, in the second embodiment, the comparison image correction processor (second image correction unit) 33 functions as the correction unit to correct the comparison image based on the correction value from the image correction value calculation processor 32. Then, the parallax image generation processor 22A searches for the corresponding points between the corrected comparison image and the corrected reference image and calculates the parallax data as the difference in the coordinate between the corresponding points of the comparison image and the feature point of the reference image. Therefore, the pixel deviation in the lateral direction depending on the pixel position can be corrected with a simple calculation.

<Vehicle>

Figure 9:
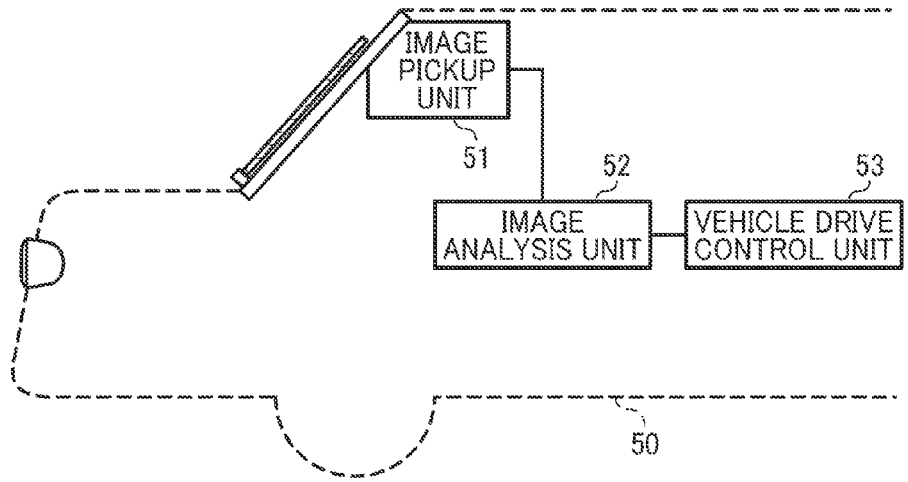
FIG. 9 is a schematic diagram illustrating a vehicle mounting the present range-finding system shown in FIG. 1.
Figure 10:
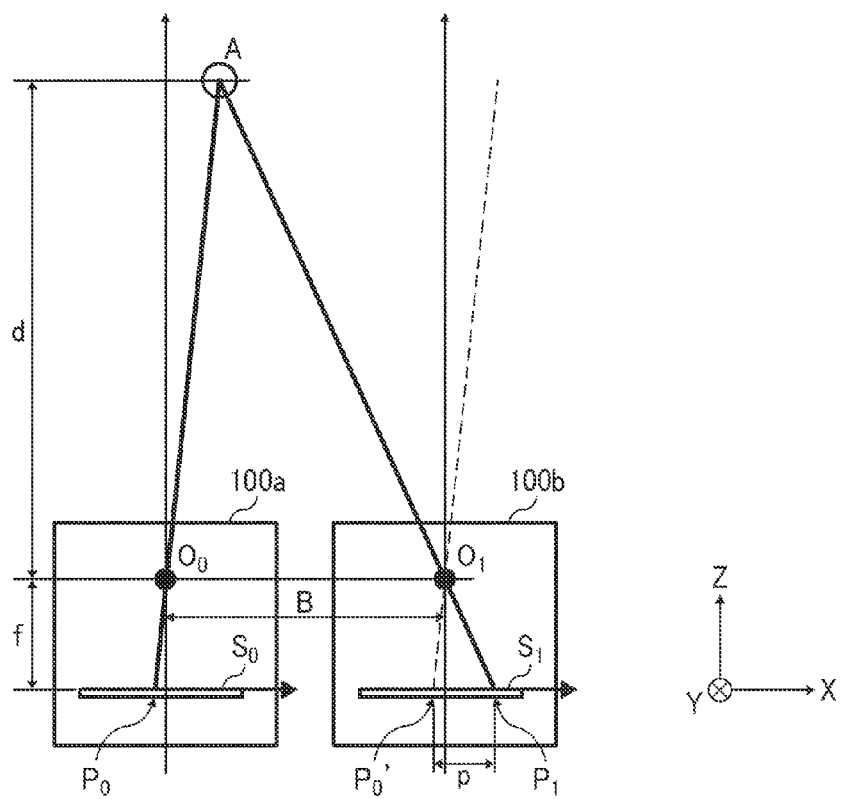
FIG. 10 is a fundamental view illustrating a general range-finding system including a stereo camera system.

FIG. 9 is a schematic diagram illustrating a vehicle 50 mounting the present range-finding system 1. An image processing system in the vehicle 50 includes an image pickup unit 51 to acquire the image forward of the vehicle 50 and an image analysis unit 52 that calculates the distance from another vehicle driving in front of the vehicle 50 based on the image acquired in the image pickup unit 51. The image pickup unit 51 is positioned near a rearview mirror in the vehicle 50 so that the image pickup unit 51 can capture the forward image containing another vehicle driving in front of the vehicle 50 and calculate a distance to another vehicle from the vehicle 50. The image of the vehicle in front acquired by the image pickup unit 51 is input to and converted into the image signal for output to the image analysis unit 52. The image analysis unit 52 analyses the output image signal from the image pickup unit 51. As for the image pickup unit 51, the stereo camera system device 11 of the present embodiment composed of the reference camera 11a and the comparison camera 11b can be used. As a part of function of the image analysis unit 52, the parallax calculator 20 can be applied.

A vehicle drive control unit 53 can control steering and brake of the vehicle 50 based on the distance from the vehicle in the front calculated by the image analysis unit 52.

Numerous additional modifications and variations are possible in light of the above teachings. It is therefore to be understood that, within the scope of the appended claims, the disclosure of this patent specification may be practiced otherwise than as specifically described herein.

What is claimed is:

1. A range-finding system, comprising:
   two imaging devices to capture multiple images from two different viewpoints; and
   a parallax calculator configured to calculate parallax based on the multiple images captured by the two imaging devices, the parallax calculator including:
   an estimation unit configured to divide an image into a plurality of image regions, each of the regions comprises a plurality of pixels, and calculate parallax based on a comparison of an amount of pixel offset for all pixels along an x coordinate throughout the whole horizontal image width to estimate a correction value based on the amount of image deviation in a lateral direction between corresponding pixel positions in the images captured by the two imaging devices; and
   a correction unit configured to correct a pre-correction parallax or an image based on the correction value estimated by the estimation unit, wherein
   a pixel deviation value in the lateral direction corresponding to a pixel position in an image is categorized at which region the concerned pixel deviation value belongs,
   a parallax correction value for each of the regions is estimated based on the categorized pixel deviation value, and
   parallax information is corrected based on the parallax correction value estimated for the region that the concerned parallax information belongs, wherein
   a parallax correction value corresponding to a pixel position other than the regions in the image is further obtained by an interpolation process based on the parallax correction value for each of the regions, and parallax information is corrected based on correction value including
   the parallax correction value obtained by the interpolation process, and
   the parallax calculator further comprises a first image correction unit to correct one of the multiple images captured by one of the imaging devices, depending on measured deviation characteristics in manufacture of the imaging devices.

2. The range-finding system according to claim 1, wherein the estimation unit is further configured to set multiple image regions in the image and estimates the correction value for each of the multiple image regions.

3. The range-finding system according to claim 2, wherein the multiple image regions are prepared by dividing an image in horizontal direction.

4. The range-finding system according to claim 1, wherein the parallax calculator further comprises a corresponding position difference calculator to search for corresponding points between the image captured by one of the imaging devices and the image captured by the other of the imaging devices and calculate a corresponding point position difference of a coordinate between the respective corresponding points in the images to output the corresponding point position difference to the correction unit as the pre-correction parallax,
   wherein the estimation unit comprises a parallax correction value calculator configured to estimate a parallax correction value,
   wherein the correction unit comprises a parallax correction unit configured to correct the corresponding position difference of the pre-correction parallax based on the parallax correction value estimated by the parallax correction value calculator.

5. The range-finding system according to claim 1,
   wherein the estimation unit comprises an image correction value calculator configured to estimate an image correction value, and
   the correction unit comprises a second image correction unit configured to correct the other of the multiple images captured by the other of the imaging devices, based on the image correction value from the image correction value calculator, and
   wherein the parallax calculator further comprises a corresponding position difference calculator configured to search for corresponding points between the image corrected by the first image correction unit and the image corrected by the second image correction unit and calculate a corresponding point position difference of a coordinate between the respective corresponding points in the corrected images for outputting the corresponding point position difference as the parallax.

6. A vehicle mounting the range-finding system of claim 1.

* * * * *